US00RE36741E

United States Patent [19]

Walther et al.

[11] E Patent Number: Re. 36,741

[45] Reissued Date of Patent: Jun. 20, 2000

[54] SELF-COUNTERSINKING SCREW WITH CUTTING RECEIVING POCKETS

[76] Inventors: Uli Walther, 1812 W. Riverdale Road, Thunder Bay, Ontario, Canada, P7C 4T9; Chao-Hsin (Michael) Yu, 7-1, Lane 127, Sec. 2, Hsing Sheng N Road, Taipei, Taiwan

[21] Appl. No.: 09/177,510

[22] Filed: Oct. 23, 1998

Related U.S. Patent Documents

Reissue of:

[64] Patent No.: 5,683,217
Issued: Nov. 4, 1997
Appl. No.: 09/622,632
Filed: Mar. 27, 1996

[51] Int. Cl.[7] ..... F16B 35/06

[52] U.S. Cl. ..... 411/399

[58] Field of Search ..... 411/399, 386, 411/387.1, 411

[56] References Cited

U.S. PATENT DOCUMENTS

| | | | |
|---|---|---|---|
| 298,427 | 5/1884 | Stone . | |
| 466,463 | 1/1892 | Holland . | |
| 1,894,708 | 1/1933 | Sardenson | 411/399 |
| 3,903,784 | 9/1975 | Dekker . | |
| 4,572,720 | 2/1986 | Rockenfeller | 411/399 |
| 4,697,969 | 10/1987 | Sparkes | 411/399 |
| 5,203,657 | 4/1993 | Nagoshi | 411/399 |
| 5,249,882 | 10/1993 | Nagoshi | 411/399 |

FOREIGN PATENT DOCUMENTS

| | | | |
|---|---|---|---|
| 9688 | 2/1879 | Canada . | |
| 12235 | 1/1881 | Canada . | |
| 24798 | 8/1886 | Canada . | |
| 43730 | 9/1893 | Canada . | |
| 168823 | 4/1916 | Canada . | |
| 672553 | 10/1963 | Canada . | |
| 1239815 | 8/1988 | Canada . | |
| 38837 | 3/1887 | Germany | 411/399 |
| 3740460 | 6/1989 | Germany | 411/399 |
| 152885 | 10/1920 | United Kingdom | 411/399 |

*Primary Examiner*—Flemming Saether

[57] ABSTRACT

A self-countersinking screw including an inverted-conical head portion formed at a top with a cavity adapted to receive a tip of a screwdriver and having a conical bottom, said conical bottom having a plurality of triangular recesses each having a lateral side extending inwardly to form a sharp edge and a space for receiving chips, a threaded portion, and a tapered portion having a large diameter connected with the head portion and a small diameter connected with the threaded portion, whereby the sharp edge will make a countersink on a workpiece when the countersunk head screw is turned therein.

12 Claims, 3 Drawing Sheets

SELF-COUNTERSINKING SCREW WITH CUTTING RECEIVING POCKETS

Matter enclosed in heavy brackets [ ] appears in the original patent but forms no part of this reissue specification; matter printed in italics indicates the additions made by reissue.

Matter enclosed in square brackets [ ] appears in the original patent but forms no part of this reissue specification; matter printed with underlining indicates the additions made by reissue.

BACKGROUND OF THE INVENTION

The invention relates to a self-counter sinking screw. Different kinds of self counter-sinking screw are know from prior art.

It is known, e.g. from U.S. Pat. No. 5,203,657 (Nagoshi et al.) to provide a self-tapping screw, where the generally conical undersurface of the head of the screw is particularly configured to prevent the bulging up of a gypsum board cover sheet. In one embodiment, the underside of the head is provided with a series of equidistantly spaced apart spot facing projection which also provide the burring action to make space for the inversely conical underside of the head. This arrangement may be useful with gypsum board panels or the like material, where the material of the board is soft, has a relatively small density and is easily displaceable or compressible. It would be inoperative when the screw would have to be used with hard finish panels such as melamine, where the material cut from the panel cannot be removed toward the threaded portion of the screw.

U.S. Pat. No. 5,199,839 (DeHaitre) discloses a self locking screw provided at its underside with a number of flat self locking projections having an arcuate edge. The edge may be used in burring action to provide a part of the seat for the underside of the screw head. However, since there is no provision for effective disposal of the burrs, the arrangement is only suitable in applications where the workpiece is from material such as wood composite material, but not with a hard, dense material.

U.S. Pat. No. 3,903,784 (Dekker) shows another self-countersinking fastener head, where the cutter edges at the underside of the head are arcuately curved. Each cutter edge defines a trailing end of a cutter recess. The volume of the recess decreases in the direction from the threaded stem to the top of the head. This is disadvantageous from the standpoint, firstly, of the manufacturing costs as a curved edge is relatively difficult to produce. Secondly, the upwards diminishing volume of the cutter recess does not provide sufficient space for the burrs from immediately adjacent areas of the workpiece as most of the material in self-countersinking is removed at the upper, larger diameter portion of the countersink.

U.S. Pat. No. 465,101 (Richards) shows an arrangement wherein knives or blades are forged to project from the truncated cone of the underside of the screw head. The edges of the knives project beyond the contour of the truncated cone. Therefore, they take away more material than is required for countersinking the seat for the underside of the screw, which weakens the strength of the engagement between the head and the workpiece.

SUMMARY OF THE INVENTION

It is an object of the present invention to provide an improved self counter-sinking screw which would further advance the art by avoiding or at least reducing the above drawbacks.

In general terms, the present invention provides a self-countersinking screw comprising, in combination:

(a) a head including screwdriver engaging means and an inversely frusto-conical underside;

(b) a threaded stem portion;

(c) said underside being provided with a plurality of generally triangular recesses increasing in volume in the general direction from said intermediate portion toward said top;

(d) each recess comprising—from the standpoint of rotation of the head driving the screw in a workplace—a trailing wall forming a cutting edge coincident with said frusto-conical underside.

Preferably, there is provided a tapered intermediate portion just under the underside of the head of the screw. Each recess preferably comprises a leading boundary which is convergent with said cutting edge in the direction along said underside and towards the axis of the screw. In accordance with another preferred feature of the invention, each said recess further comprises a flat upper boundary wall extending between upper ends of said trailing wall and said linear boundary in a circumferential direction and disposed near said top. The bottom of each recess is preferably planar and slopes such as to increase the depth of the recess in a direction toward the corner between the upper boundary wall and the trailing wall.

BRIEF DESCRIPTION OF THE DRAWINGS

The invention will be described by way of a preferred embodiment, with reference to the accompanying simplified, diagrammatic, not-to-scale drawings, wherein.

DETAILED DESCRIPTION OF A PREFERRED EMBODIMENT

Figure 1:
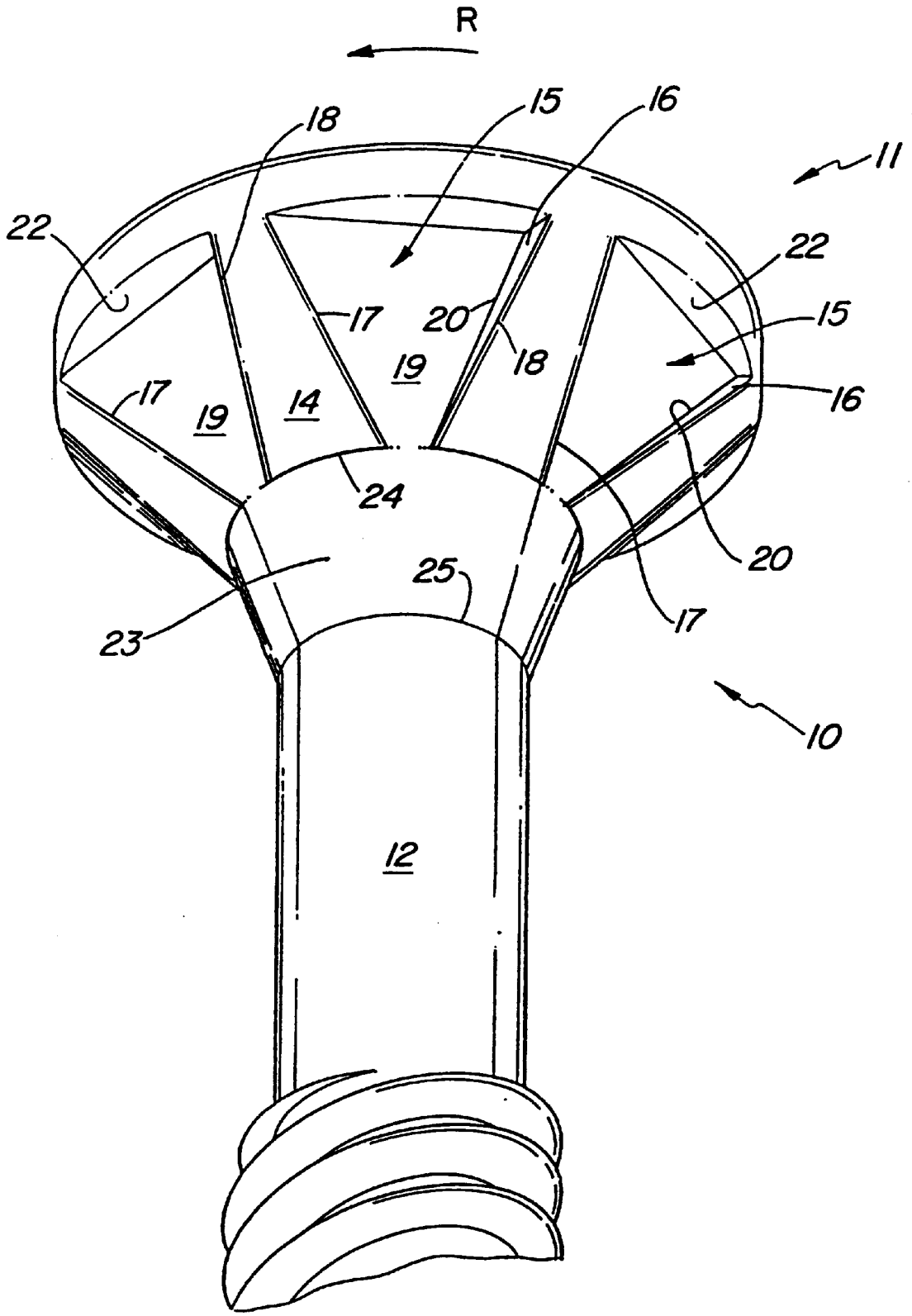
FIG. 1 is a perspective view of the upper part of a screw incorporating the features of the present invention.
Figure 3:
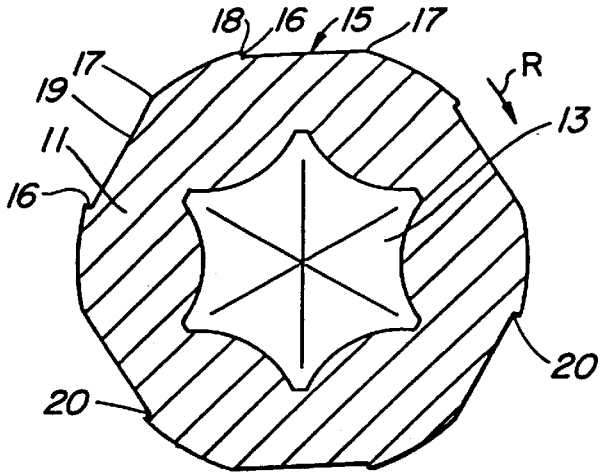
FIG. 3 is section III—III of FIG. 2.
Figure 2:
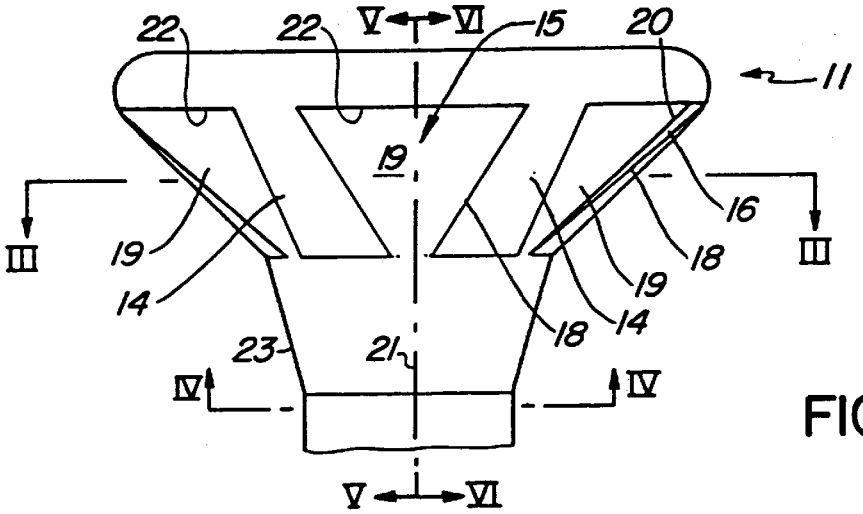
FIG. 2 is a front or side view of the upper part of the screw shown in FIG. 1.

With reference to the drawings and in particular to FIGS. 1, 2 and 3 thereof, the self-countersinking screw 10 comprises a head 11 and a threaded stem portion 12. The head 11 has the general shape of an inverted-conical member and is formed; at the top, with screwdriver engaging means, in the embodiment shown, a hexagonal recess 13 adapted to receive the tip of a screwdriver (not shown). However, it should be noted that the screwdriver engaging means may be of any other suitable shape. The head exhibits an inversely frusto-conical underside 14 on which there are a plurality of generally triangular recesses 15.

The term "generally" triangular is used to indicate that the contour is not a true triangle as will be apparent from the description which follows. Each recess 15 comprises, from the standpoint of the direction of rotation R (FIGS. 1, 3, 4) driving the screw in a workpiece, a trailing wall 16 and a leading boundary 17. The trailing wall 16 forms a cutting edge 18 at the merger of the trailing wall 16 with the surface of the underside 14.

In the embodiment shown, the leading boundary 17 is an obtuse angled corner between a flat, planar bottom wall 19 and the underside 14. The bottom wall 19 merges, at the trailing end of the recess 15, with a bottom corner 20 where the bottom wall 19 adjoins the trailing wall 16. As shown, for instance, in FIG. 1, the trailing wall 16 increases in height in the direction towards the periphery of the head 11. In other words, the inclination of the bottom wall 19 is such that the depth of the recess 15 and thus its volume is at a maximum at the part near the periphery of the top of the head 11.

The preferred embodiment shown in the drawings has both the leading boundary 17 and the trailing wall 16 convergent toward the axis 21 (FIG. 2) of the screw 10. The leading boundary 17 and the cutting edge 18 are preferably straight and do not actually meet at their lower ends, where they are closest to the axis 21. The overall contour of the recess 15 can nevertheless be referred to as being "generally" triangular.

The "generally triangular" contour of each recess 15 is enclosed by a generally planar upper boundary wall 22 which extends *between upper ends of the trailing wall 16 and of the leading boundary 17* in a circumferential direction and is generally parallel with the top of the head 11. Thus, the wall 22 appears linear in a side view (FIG. 2). The walls 22 of all recesses 15 are coplanar with one another as can be seen from FIG. 1 and are perpendicular to the axis 21 of the screw.

Figure 4:
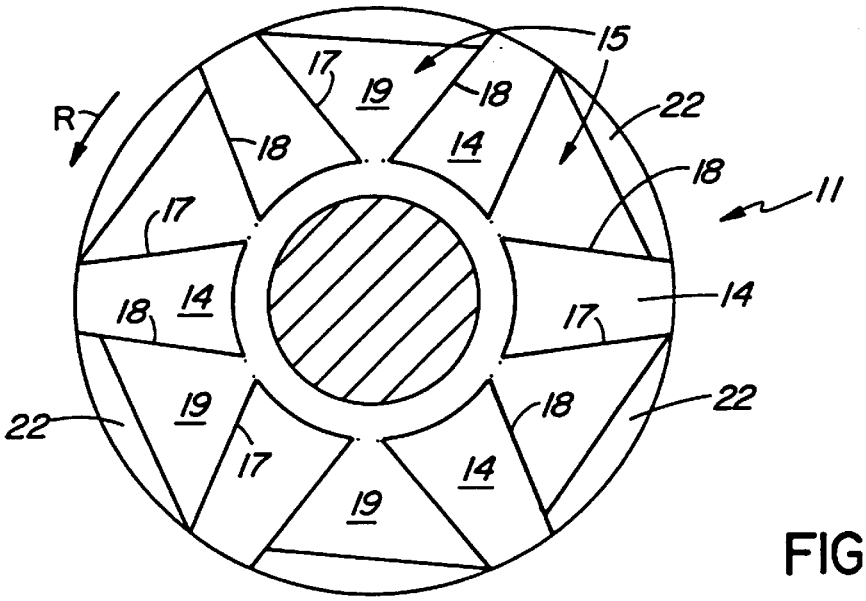
FIG. 4 is section IV—IV of FIG. 2.

FIG. 4 shows the radial width of the upper boundary wall 22, merges with the obtuse angled edge of the leading boundary 17, and has a zero width there. On the contrary, at the trailing wall 16, the radial width of the boundary wall 22 is higher due to the inclination of the bottom wall 19. Thus, it can be seen that the bottom wall 19 slopes into the respective cutout 15 from the leading boundary 17 to the corner between the trailing wall 16 and the boundary wall 22. This, together with the widening of the recess 15 in the outward direction, is the preferred way of providing an increase in the volume of each cutout in the direction along the underside 14 and away from the axis 21. The depth of the recess 15 is at a maximum at the corner of the walls 22 and 16.

A tapered intermediate portion 23 is formed between the head 11 and the threaded stem 12. It includes a large diameter section 24 merging with the head 11 and small diameter section 25 merging with the threaded portion 12.

Figure 6:
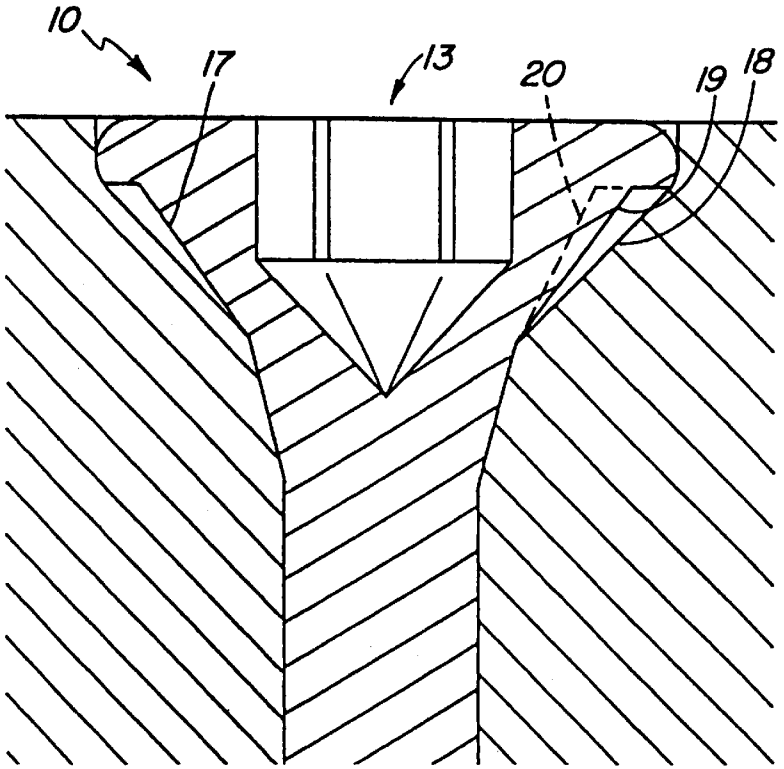
FIG. 6 is a view similar to that of FIG. 5 but showing the screw fully threaded in a workpiece.
Figure 5:
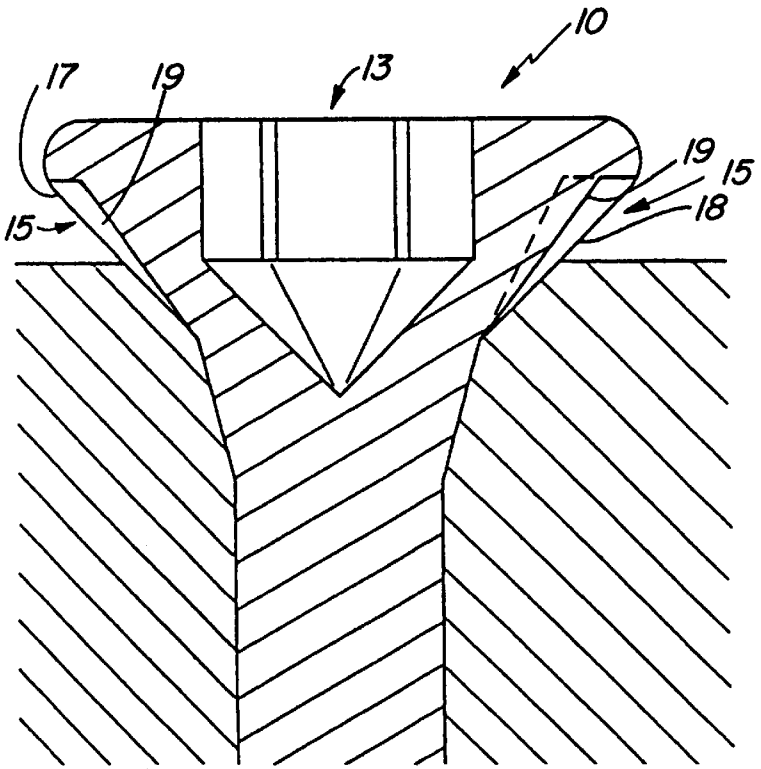
FIG. 5 is a cross-sectional view showing the screw of the present invention partly threaded in a workpiece.

In operation, (FIGS. 5 and 6), the screw is threaded into a workpiece [26] which is typically made of wood laminated with a Melamine™ or the like surface finish sheet. The intermediate portion has a small included angle of the frustoconical face. Thus, when the screw is driven into a workpiece, the frustoconical face is drawn into a passage previously made by the stem of the screw. Eventually, the underside 14 having a relatively large included angle, reaches the surface of the workpiece and as it is pressed against the bore left after the cutting edges 18 of the recesses 15, cut or burr a conical countersink in the workpiece. Since the cutting edges 18 are coincident with the frustoconical surface of the underside, the countersink corresponds exactly to the taper of the underside thus providing a firm and accurate engagement between the head of the screw and the countersink in the workpiece. The plurality of co-planar upper boundary walls 22 further reinforces the firm hold of the screw in the workpiece by blocking axial displacement of the screw beyond a certain limit. The gradually increasing depth of the recesses 15 accommodates chips developed by the countersinking thus permitting firm engagement of the underside surface 14 with the countersink. The overall structure of the head is simpler than in known prior art and is thus less expensive to produce.

Those skilled in the art will readily appreciate that many modifications may exist of the preferred embodiment described without departing from the scope of the present invention. The upper part of the underside of the head may be modified to provide an outwardly projecting flange. The cutting edge may be curved even though a straight edge is preferred from the standpoint of manufacturing costs. The leading boundary 17, instead of being an obtuse angled joinder, may have the shape of an edge of a leading wall. These are but a few of examples of many modifications within the scope of the present invention.

Therefore, I wish to protect by Letters Patent which may issue on this application all such embodiments as fairly fall within the scope of my contribution to the art.

We claim:

1. A self-countersinking screw having a body with a longitudinal axis, said body comprising in combination:

(a) a head which includes screwdriver engaging means at a top face and an underside having an inversely frusto-conical surface;

(b) a threaded stem portion integral with the head and comprising a thread adapted to drive the screw into a workpiece when the threaded stem portion is rotated about said axis in a predetermined direction;

(c) a plurality of generally triangular recesses on said underside, said recesses having straight sides, each said recess being axially spaced from said stem and from said top face;

(d) each recess comprising from the standpoint of said predetermined direction, a generally planar trailing wall forming a linear cutting edge coincident with said frusto-conical underside;

(e) each said recess further including:

(i) a leading wall which is generally planer and convergent with said trailing wall in the direction along said underside and towards the axis of the screw;

(ii) a generally planer upper boundary wall extending between upper ends of said trailing wall and said leading wall in a circumferential direction and disposed at a spacing from said top along said frusto-conical surface; and (iii) a flat, generally triangular bottom.

2. The screw of claim [1] *8*, further comprising a tapered intermediate portion tapering in a direction away from the head and disposed between said underside and said stem, said intermediate portion including a large diameter section adjoining said underside, and a small diameter section adjoining said threaded stem portion.

3. The screw as claimed in claim [1] *8*, wherein the upper boundary walls are all generally coplanar with a single plane which is generally perpendicular to the axis of the screw and is spaced from said top surface.

4. The screw as claimed in claim [1] *8* wherein the depth of each said recess increases in the direction from said leading [wall] *boundary* to a corner between said trailing wall and said upper boundary wall.

5. A self-countersinking screw having a body with a longitudinal axis, said body comprising in combination:

(a) a head which includes screwdriver engaging means at a top face and an underside having an inversely frusto-conical surface;

(b) a threaded stem portion integral with the head and comprising thread adapted to drive the screw into a workpiece when the threaded stem is rotated about said axis in a predetermined direction;

(c) a plurality of generally triangular recesses on said underside, each said recess being axially spaced from said stem and from said top face;

(d) a tapered intermediate portion tapering in a direction away from the head and disposed between said underside and said stem portion, said intermediate portion including a large diameter section adjoining said underside, and a small diameter section adjoining said threaded stem portion;

(e) each said recess including:

(i) from the standpoint of said predetermined direction, a generally planar trailing wall forming a linear cutting edge coincident with said frusto-conical underside;

(ii) a leading wall which is generally planar and convergent with said trailing wall in the direction along said underside and towards the axis of the screw;

(iii) a generally planar upper boundary wall extending between upper ends of said trailing wall and said leading wall in a circumferential direction and disposed at an axial spacing from said top along said frusto-conical surface; and (iv) a flat, generally triangular bottom.

6. A self-countersinking screw having a body with a longitudinal axis, said body comprising in combination:

(a) a head which includes screwdriver engaging means at a top face and an underside having an inversely frusto-conical surface;

(b) a threaded stem portion integral with the head and comprising thread adapted to drive the screw into a workpiece when the threaded stem is rotated about its axis in a predetermined direction;

(c) a plurality of generally triangular recesses on said underside, each said recess being axially spaced from said stem portion and from said top face;

(d) a tapered intermediate portion tapering in a direction away from the head and disposed between said underside and said stem portion, said intermediate portion including a large diameter section adjoining said underside, and a small diameter section adjoining said threaded stem portion;

(e) each said recess including;

(i) from the standpoint of said predetermined direction, a generally planar trailing wall forming a linear cutting edge coincident with said frusto-conical underside;

(ii) a leading wall which is generally planar and convergent with said trailing wall in the direction along said underside and towards the axis of the screw;

(iii) a generally planar upper boundary wall extending between upper ends of said trailing wall and said leading wall in a circumferential direction and disposed at an axial spacing from said top along said frusto-conical surface; and (iv) a flat, generally triangular bottom;

(f) the upper boundary walls of each said recesses being all generally coplanar with a single plane generally perpendicular to the axis of the screw and spaced from said top surface.

7. A self-countersinking screw having a body with a longitudinal axis, said body comprising in combination:

(a) a head which includes screwdriver engaging means at a top face and an underside having an inversely frusto-conical surface;

(b) a threaded stem portion integral with the head and comprising thread adapted to drive the screw into a workpiece when the threaded stem is rotated about said axis in a predetermined direction;

(c) a plurality of generally triangular recesses on said underside, each said recess being axially spaced from said stem portion and from said top face[, the depth of each said recess increasing in the direction from a leading wall to a corner between a trailing wall and said upper boundary wall];

(d) each said recess having a tapered intermediate portion tapering in a direction away from the head and disposed between said underside and said stem portion, said intermediate portion including a large diameter section adjoining said underside, and a small diameter section adjoining said threaded stem portion;

(e) each said recess including:

(i) from the standpoint of said predetermined direction, generally planar trailing wall forming a linear cutting edge coincident with said frusto-conical underside;

(ii) a leading wall which is generally planar and convergent with said trailing wall in the direction along said underside and towards the axis of the screw;

(iii) a generally planar upper boundary wall extending between upper ends of said trailing wall and said leading wall in a circumferential direction and disposed at an axial spacing from said top along said frusto-conical surface; and (iv) a flat, generally triangular bottom so arranged that the depth of each said recess increases in the direction from said leading wall to a corner between said trailing wall and said upper boundary wall;

(f) the upper boundary walls of each said recesses being all generally coplanar with a single plane generally perpendicular to the axis of the screw and spaced from said top surface.

*8. A self-countersinking screw having a body with a longitudinal axis, said body comprising in combination:*

*(a) a head which includes screwdriver engaging means at a top face and an underside having an inversely frusto-conical surface;*

*(b) a threaded stem portion integral with the head and comprising a thread adapted to drive the screw into a workpiece when the threaded stem portion is rotated about said axis in a predetermined direction;*

*(c) a plurality of generally triangular recesses on said underside, said recesses having straight sides, each said recess being axially spaced from said stem and from said top face;*

*(d) each recess comprising from the standpoint of said predetermined direction, a generally planar trailing wall forming a cutting edge coincident with said frusto-conical underside;*

*(e) each said recess further including:*

*(i) a leading boundary which is convergent with said cutting edge in the direction along said underside and towards the axis of the screw;*

*(ii) a generally planar upper boundary wall extending between an upper end of said trailing wall and an upper end of said leading boundary in a circumferential direction and disposed at a spacing from said top along said frusto-conical surface; and*

*(iii) a flat, generally triangular bottom.*

*9. A self-countersinking screw having a body with a longitudinal axis, said body comprising in combination:*

*(a) a head which includes screwdriver engaging means at a top face and an underside having an inversely frusto-conical surface;*

(*b*) *a threaded stem portion integral with the head and comprising thread adapted to drive the screw into a workpiece when the threaded stem is rotated about said axis in a predetermined direction;*

(*c*) *a plurality of generally triangular recesses on said underside, each said recess being axially spaced from said stem and from said top face;*

(*d*) *a tapered intermediate portion tapering in a direction away from the head and disposed between said underside and said stem portion, said intermediate portion including a large diameter section adjoining said underside, and a small diameter section adjoining said threaded stem portion;*

(*e*) *each said recess including:*

(*i*) *from the standpoint of said predetermined direction, a generally planar trailing wall forming a linear cutting edge coincident with said frusto-conical underside;*

(*ii*) *a leading boundary which is convergent with said cutting edge in the direction along said underside and towards the axis of the screw;*

(*iii*) *a generally planar upper boundary wall extending between an upper end of said trailing wall and an upper end of said leading boundary in a circumferential direction and disposed at an axial spacing from said top along said frusto-conical surface; and*

(*iv*) *a flat, generally triangular bottom.*

*10. A self-countersinking screw having a body with a longitudinal axis, said body comprising in combination:*

(*a*) *a head which includes screwdriver engaging means at a top face and an underside having an inversely frusto-conical surface;*

(*b*) *a threaded stem portion integral with the head and comprising thread adapted to drive the screw into a workpiece when the threaded stem portion is rotated about its axis in a predetermined direction;*

(*c*) *a plurality of generally triangular recesses on said underside, each said recess being axially spaced from said stem portion and from said top face;*

(*d*) *a tapered intermediate portion tapering in a direction away from the head and disposed between said underside and said stem portion, said intermediate portion including a large diameter section adjoining said underside, and a small diameter section adjoining said threaded stem portion;*

(*e*) *each said recess including:*

(*i*) *from the standpoint of said predetermined direction, a generally planar trailing wall forming a linear cutting edge coincident with said frusto-conical underside;*

(*ii*) *a leading boundary which is convergent with said cutting edge in the direction along said underside and towards the axis of the screw;*

(*iii*) *a generally planar upper boundary wall extending between an upper end of said trailing wall and an upper end of said leading boundary in a circumferential direction and disposed at an axial spacing from said top along said frusto-conical surface; and*

(*iv*) *a flat, generally triangular bottom:*

(*f*) *the upper boundary walls of each said recesses being all generally coplanar with a single plane generally perpendicular to the axis of the screw and spaced from said top surface.*

*11. A self-countersinking screw having a body with a longitudinal axis, said body comprising in combination:*

(*a*) *a head which includes screwdriver engaging means at a top face and an underside having an inversely frusto-conical surface;*

(*b*) *a threaded stem portion integral with the head and comprising thread adapted to drive the screw into a workpiece when the threaded stem is rotated about said axis in a predetermined direction;*

(*c*) *a plurality of generally triangular recesses on said underside, each said recess being axially spaced from said stem portion and from said top face;*

(*d*) *each said recess having a tapered intermediate portion tapering in a direction away from the head and disposed between said underside and said stem portion, said intermediate portion including a large diameter section adjoining said underside, and a small diameter section adjoining said threaded stem portion;*

(*e*) *each said recess including:*

(*i*) *from the standpoint of said predetermined direction, a generally planar trailing wall forming a linear cutting edge coincident with said frusto-conical underside;*

(*ii*) *a leading boundary which is convergent with said cutting edge in the direction along said underside and towards the axis of the screw;*

(*iii*) *a generally planar upper boundary wall extending between an upper end of said trailing wall and said leading boundary in a circumferential direction and disposed at an axial spacing from said top along said frusto-conical surface; and*

(*iv*) *a flat, generally triangular bottom so arranged that the depth of said recess increases in the direction from said leading boundary to a corner between said trailing wall and said upper boundary wall;*

(*f*) *the upper boundary walls of each said recesses being all generally coplanar with a single plane generally perpendicular to the axis of the screw and spaced from said top surface.*

*12. A self-countersinking screw having a body with a longitudinal axis, said body comprising in combination:*

(*a*) *a head which includes screwdriver engaging means at a top face and an underside having an inversely frusto-conical surface;*

(*b*) *a threaded stem portion integral with the head and comprising a thread adapted to drive the screw into a workpiece when the threaded stem portion is rotated about said axis in a predetermined direction;*

(*c*) *a plurality of generally triangular recesses on said underside, said recesses having straight sides, each said recess being axially spaced from said stem and from said top face;*

(*d*) *each recess comprising from the standpoint of said predetermined direction, a generally planar trailing wall forming a linear cutting edge coincident with said frusto-conical underside;*

(*e*) *each said recess further including:*

(*i*) *a leading boundary which is convergent with said cutting edge in the direction along said underside and towards the axis of the screw;*

(*ii*) *a generally planar upper boundary wall extending between an upper end of said trailing wall and an upper end of said leading boundary in a circumferential direction and disposed at a spacing from said top along said frusto-conical surface; and*

(*iii*) *a flat, generally triangular bottom.*

* * * * *